US007711798B1

(12) United States Patent
Sahai et al.

(10) Patent No.: US 7,711,798 B1
(45) Date of Patent: May 4, 2010

(54) METHOD AND COMPUTER PROGRAM FOR OFFERING PRODUCTS AND SERVICES BY EXAMINING USER ACTIVITY

(75) Inventors: Shankar Sahai, Fremont, CA (US); Daniel Dante Lorenso, Sunnyvale, CA (US)

(73) Assignee: Paltalk Holdings, Inc., New York, NY (US)

( * ) Notice: Subject to any disclaimer, the term of this patent is extended or adjusted under 35 U.S.C. 154(b) by 1638 days.

(21) Appl. No.: 09/614,867

(22) Filed: Jul. 12, 2000

(51) Int. Cl.
*G06F 15/16* (2006.01)
(52) U.S. Cl. .................... 709/219; 709/217; 709/218; 709/225; 709/227; 709/229; 709/239; 709/242
(58) Field of Classification Search .................... 705/26; 709/227–229, 217–219, 203, 225, 239, 242; 707/200; 710/36
See application file for complete search history.

(56) References Cited

U.S. PATENT DOCUMENTS

| 5,724,508 | A |   | 3/1998  | Harple et al. |         |
|-----------|---|---|---------|---------------|---------|
| 5,764,916 | A |   | 6/1998  | Busey et al.  |         |
| 5,828,839 | A |   | 10/1998 | Moncreiff     |         |
| 5,963,915 | A | * | 10/1999 | Kirsch        | 705/26  |
| 6,035,334 | A | * | 3/2000  | Martin et al. | 709/228 |
| 6,064,979 | A | * | 5/2000  | Perkowski     | 705/26  |
| 6,101,486 | A | * | 8/2000  | Roberts et al.| 705/27  |
| 6,112,240 | A | * | 8/2000  | Pogue et al.  | 709/219 |
| 6,151,643 | A | * | 11/2000 | Cheng et al.  | 710/36  |
| 6,161,137 | A |   | 12/2000 | Ogdon et al.  |         |
| 6,195,091 | B1|   | 2/2001  | Harple et al. |         |

(Continued)

OTHER PUBLICATIONS

Telecommunications system. St. Louis: Jun. 1997. vol. 69, Iss. 6; p. 8, 2 Cookies on your hard drive. Wayland Hancock.*

(Continued)

*Primary Examiner*—Dohm Chankong
(74) *Attorney, Agent, or Firm*—Ward & Olivo (57) ABSTRACT

A system method and computer program product for redirecting a consumer (i.e., user) to a previously selected Web site is provided. In an embodiment of the invention, the user acquires a product or service from a first Web site. In the course of acquiring the product or service, the first Web site places a cookie on the user's computer. The cookie identifies the first Web site and associates it with the product or service the user has purchased. Subsequently, the user will receive a Universal Resource Locator (URL) from a second Web site offering the same product or service. When the user activates the URL, they are directed to the second Web site. In response, the second Web site searches for a relevant cookie located on the user's computer. If found, the second Web site determines from the cookie whether the user already possesses the particular product or service being offered by the second Web site. If the second Web site determines that the user already possesses the product or service, the second Web site redirects the user to the first Web site, which is specified by the cookie. If the second Web site determines that the user does not possess the product or service, the second Web site proceeds to offer the product or service to the user. As a result, a user who already possesses the product or service will not receive duplicate offers to supply the product or service from multiple Web sites.

11 Claims, 5 Drawing Sheets

U.S. PATENT DOCUMENTS

| | | |
|---|---|---|
| 6,212,548 B1 | 4/2001 | DeSimone et al. |
| 6,275,490 B1 | 8/2001 | Mattaway et al. |
| 6,339,423 B1 * | 1/2002 | Sampson et al. ............ 709/219 |
| 6,360,366 B1 * | 3/2002 | Heath et al. ................. 709/203 |
| 6,424,994 B1 | 7/2002 | Pirich et al. |
| 6,433,795 B1 | 8/2002 | MacNaughton et al. |
| 6,453,347 B1 * | 9/2002 | Revashetti et al. .......... 709/224 |
| 6,463,471 B1 | 10/2002 | Dreke et al. |
| 6,484,196 B1 | 11/2002 | Maurille |
| 6,487,583 B1 | 11/2002 | Harvey et al. |
| 6,522,333 B1 | 2/2003 | Hatlelid et al. |
| 6,539,421 B1 | 3/2003 | Appelman et al. |
| 6,546,554 B1 * | 4/2003 | Schmidt et al. ............. 709/203 |
| 6,549,612 B2 | 4/2003 | Gifford et al. |
| 6,715,080 B1 * | 3/2004 | Starkovich et al. .......... 709/228 |
| 6,807,562 B1 | 10/2004 | Pennock et al. |
| 6,954,799 B2 * | 10/2005 | Lerner ........................ 709/227 |
| 6,985,953 B1 * | 1/2006 | Sandhu et al. ............. 709/229 |
| 7,010,582 B1 * | 3/2006 | Cheng et al. ................ 709/219 |
| 7,039,699 B1 * | 5/2006 | Narin et al. ................. 709/224 |
| 7,143,195 B2 * | 11/2006 | Vange et al. ................ 709/249 |
| 7,171,386 B1 | 1/2007 | Raykhman |
| 7,249,056 B1 * | 7/2007 | Crouthamel et al. .......... 705/26 |
| 7,302,402 B2 * | 11/2007 | Callaghan et al. ............. 705/26 |
| 2001/0034689 A1 | 10/2001 | Heilman |
| 2001/0048449 A1 | 12/2001 | Baker |
| 2002/0019828 A1 * | 2/2002 | Mortl ......................... 707/200 |
| 2002/0023132 A1 | 2/2002 | Tornabene et al. |
| 2002/0035611 A1 * | 3/2002 | Dooley ....................... 709/218 |
| 2002/0056119 A1 | 5/2002 | Moynihan |
| 2002/0062343 A1 * | 5/2002 | Appleman et al. .......... 709/203 |
| 2002/0073163 A1 | 6/2002 | Churchill et al. |
| 2002/0099622 A1 * | 7/2002 | Langhammer ............... 705/26 |
| 2002/0199004 A1 * | 12/2002 | Jaye ........................... 709/228 |
| 2005/0181878 A1 | 8/2005 | Danieli et al. |

OTHER PUBLICATIONS

The Dark Side. cookiecentral Jun. 24, 2000.*
Microsoft Cookies jump Domains. Kevin Poulsen Security Focus.*
Cookies: A Bad Wrap? Chris Spencer (1999).*
Persistent Client State HTTP Cookies.*
About cookies.*
Samar, Vipin, "Single Sign-On Using Cookies for Web Applications," Proceedings of the IEEE 8$^{th}$ International Workshops on Enabling Technologies: Infrastructure for Collaborative Enterprises, Jun. 16-18, 1999, pp. 158-163.*

* cited by examiner

METHOD AND COMPUTER PROGRAM FOR OFFERING PRODUCTS AND SERVICES BY EXAMINING USER ACTIVITY

BACKGROUND OF THE INVENTION

1. Field of the Invention

The present invention relates generally to the field of e-commerce and more specifically to the field of product marketing over the World Wide Web.

2. Related Art

The World Wide Web (also referred to as "the Web"), which is the part of the global Internet where commerce typically takes place, has only been in existence since about 1993. Before the Web, there were no graphics, sound or moving pictures on the Internet, which was used mostly by researchers and those within university communities. In the few years it has been in existence, the Web has become a leading force for business. Statistics show that the Web generates billions of dollars worth of business per year. Product and service sales and fees account for a majority of the current revenues. Retailers, manufacturers, wholesalers, distributors and the like are all offering and selling their services and products over the Web (i.e., "online"). Accordingly, the methods of conducting business for entire industries are changing. For example, the real estate and travel industries have gone through dramatic changes as more and more consumers have started shopping and buying online.

There are hundreds of thousands of products and services offered on the Web. In addition, there are many avenues for selling a product or service. Makers of many software products, for example, will often supply their product to multiple online vendors for eventual sale to a consumer (i.e., an end user). Consequently, many online vendors offer the same products for sale.

There are millions of sites on the Web. Somehow, a vendor Web site has to inform customers about who they are and what they have to offer. Many vendor Web sites with great business ideas fail because they cannot reach potential customers or do not effectively sell their products or services. This is because many Web sites do not know how to best route customer traffic to their sites. A Web site without customer traffic is like a store that is empty. That is, where there are no customers, there can be no sales.

Methods of letting the public know what products and/or service an online vendor has to offer include, for example, sending out mass electronic mailings ("e-mails") containing product information and placing advertisements on other, popular Web sites. However, these tactics are indiscriminate as to who receives the product information. As a result, a Web user who has purchased a product or service from one vendor can subsequently be solicited by other vendors selling the same product or service. Because advertising may be different among multiple vendors of the same product or service, a Web user may confusingly think that different products or services are being offered. Subsequently, a Web user already possessing a product or service may inadvertently attempt to acquire the same product or service from another vendor. This can be time-consuming and annoying for a Web user. As a result, this may affect sales of vendor Web sites as Web users may want to avoid such confusing situations in the future.

Accordingly, there exists a need for a system, method and computer program product whereby a Web user who already possesses a product or service purchased on the Web does not receive duplicate offers for the same product or service from multiple, other Web sites.

SUMMARY OF THE INVENTION

The present invention provides a system method and computer program product for redirecting a consumer (i.e., user) to a previously selected Web site. In an embodiment of the invention, the user acquires a product or service from a first Web site. In the course of acquiring the product or service, the first Web site places a cookie on the user's computer. The cookie identifies the first Web site and associates it with the product or service the user has purchased.

Subsequently, the user will receive a Universal Resource Locator (URL) from a second Web site offering the same product or service. The user may receive the URL via e-mail, a Web page or a computer program. When the user activates the URL, they are directed to the second Web site. In response, the second Web site searches for a relevant cookie located on the user's computer. If found, the second Web site determines from the cookie whether the user already possesses the particular product or service being offered by the second Web site.

If the second Web site determines that the user already possesses the product or service, the second Web site redirects the user to the first Web site, which is specified by the cookie. If the second Web site determines that the user does not possess the product or service, the second Web site proceeds to offer the product or service to the user. As a result, a user who already possesses the product or service will not receive duplicate offers to supply the product or service from multiple Web sites.

Further embodiments, features and advantages of the present invention as well as the structure and operation of the various embodiments of the present invention are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention. In the drawings.

The present invention will now be described with reference to the accompanying drawings. In the drawings like reference numbers indicate identical or functionally similar elements. Additionally, the leftmost digits of a reference number identify the drawing in which the reference number first appears.

DETAILED DESCRIPTION OF THE PREFERRED EMBODIMENTS

Overview

The present invention is directed towards a system, method and computer program product for redirecting a Web user to a previously selected Web site. The present invention is described in terms of a network environment, specifically the Internet environment. Description in these terms is provided for convenience only. However, it is not intended that the present invention be limited to application in this example environment. In fact, after reading the following description, it will become apparent to a person skilled in the relevant art how to implement the invention in alternative environments known now or developed in the future.

TERMINOLOGY

To more clearly delineate the present invention, an effort is made throughout the specification to adhere to the following term definitions as consistently as possible.

The term "Web page" is used to refer to a file, typically written in Hypertext Markup Language (HTML), Java®, Extended Markup Language (XML), Active Server® or Cold Fusion® format. Such a file is typically viewed using a Web browser.

The term "Web site" is used to refer to a group of Web pages that are associated in some manner, such as geographically, contextually or categorically. A Web site usually refers to a group of Web pages located within one domain name.

The term "link" is used to refer to any item on a Web page or e-mail that, when clicked (i.e., activated), opens a connection (i.e., "jumps") to another Web site or Web page. Textual links are typically referred to as "Hyper Text."

The term "Universal Resource Locator (URL)" is used to refer to an Internet address for a Web page or Web site. A link to a Web site usually contains a URL. The terms "URL" and "link" are used interchangeably.

The term "cookie" is used to refer to information that is located on a user's computer for later use by a Web site. A cookie is typically placed on the user's computer by a Web site upon the user's first visit to that Web site and may be updated upon future visits. An example of a cookie is a text file containing a user's login name that a Web site places on a user's computer. Whenever the user visits the Web site in the future, the cookie is sent to the Web site so that the user is recognized.

The term "Internet request" is used to refer to a request for a Web page over the Internet. An example of an Internet request is a Hyper Text Transfer Protocol (HTTP) request for a Web page.

The term "browser" is used to refer to a computer program, such as a Web browser, that can be used to view a Web page.

The term "user" is used to refer to a person using a browser, executing on a computer system, to view a Web page.

The term "redirect" is used to refer to the process by which a Web user requesting a first Web site is instead supplied with a second Web site.

The term "register" is used to refer to the process by which a Web user supplies information to a Web site for the purpose of being properly identified in future logins at that Web site.

The term "server side program" is used to refer to a program which is located on the server side of a client server system. Examples of widely used server side programs are: Common Gateway Interface (CGI) scripts, Java servlets, Hypertext Preprocessor (PHP) scripts and Perl scripts.

The term "client side program" is used to refer to a program that is located and runs on the clients side of a client server system. Examples of widely used client side programs are: Java applets, Java scripts and Active X controls.

Overview of the Present Invention

Figure 1:
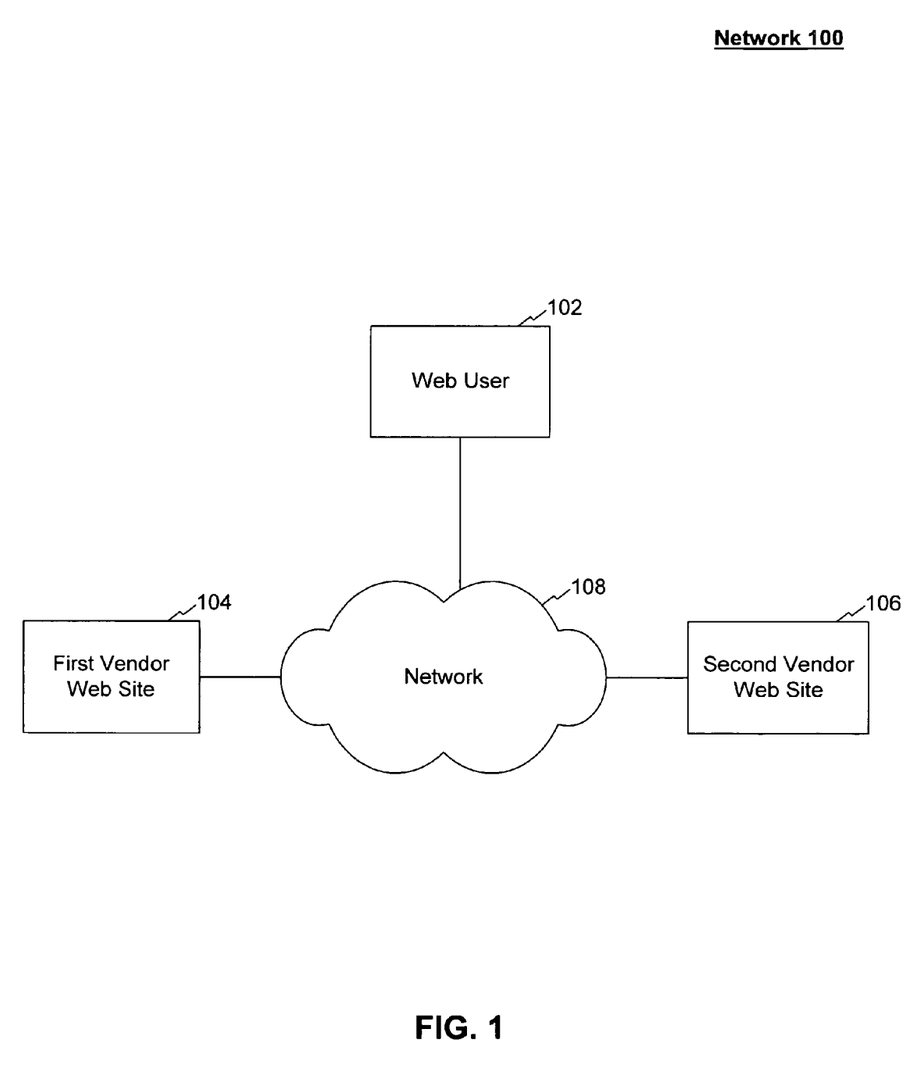
FIG. 1 illustrates an example of a network environment that supports the present invention.

FIG. 1 shows an example network architecture 100 that supports the redirecting of a Web user to a previously selected Web site according to an embodiment of the present invention. Architecture 100 includes a Web user 102 (user 102), a first vendor Web site 104 (Web site 104), a second vendor Web site 106 (Web site 106) and a network 108. In a preferred embodiment, network 108 is a packet switched wide area network (WAN) such as the global Internet. In this embodiment, computers of user 102, Web site 104 and Web site 106 can be standard personal computers that are connected to the Internet, or wireless devices that wirelessly access the Internet (e.g., a PalmPilot® or a Web capable wireless phone). Network 108 can alternatively be a private WAN, a local area network (LAN), a telecommunications network or any combination of the above mentioned networks. Therefore, Web user 102 can reside at a remote location from Web site 104 and Web site 106.

In accordance with one embodiment of the invention, user 102 views an item such as an e-mail, a Web page or a computer program, that is provided by Web site 104. The item offers a product or service that may be supplied by Web site 104 and contains a URL to Web site 104. (Various methods of solicitation via the Web are described in greater detail below.) User 102 then follows the URL to Web site 104 and peruses the product or service. If user 102 decides that the product or service is worthy, user 102 proceeds to acquire the product or service from Web site 104 via the Web. This can be accomplished by downloading the product from Web site 104, purchasing the product for shipping via Web site 104 or any other means of acquiring a product or service via the Web. Subsequently, Web site 104 places a cookie on the computer of user 102. (The process of placing a cookie and the contents of a cookie are described in greater detail below.) Later, user 102 receives an offer for the same product or service from Web site 106. User 102 then follows the URL provided by Web site 106. Subsequently, a program searches for a relevant cookie on the computer of user 102. (The location of the program—client side or server side—is described in greater detail below.) The program then determines from the cookie whether user 102 already possesses the product or service. If it is determined that user 102 already possesses the product or service, user 102 is redirected to Web site 104. Otherwise, Web site 106 proceeds to offer to supply the product or service to user 102.

The present invention, as described above, has the advantage of avoiding duplicate offers of the same product or service to a user who already possesses the product or service. This allows the suppliers of the product or service to concentrate their marketing efforts on users who do not yet possess the product or service. As such, this can result in lower advertising costs and an increased customer base. In addition, the present invention avoids possibly annoying communications received by customers who have already acquired the product or service.

Web Product and Service Offerings

Figure 2:
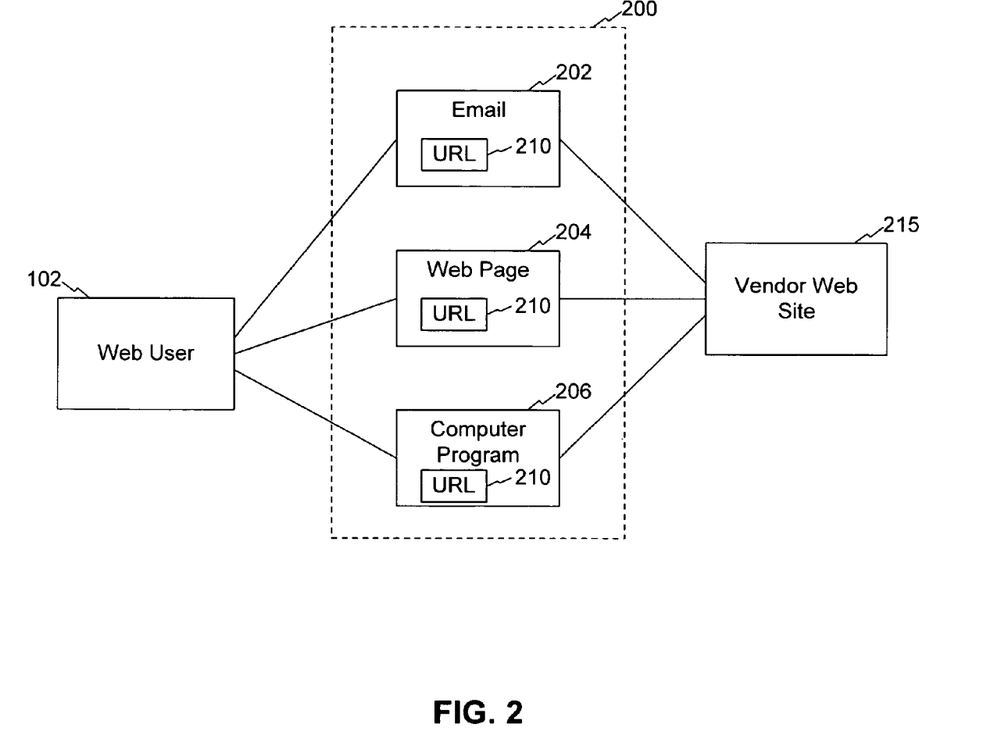
FIG. 2 illustrates the various mechanisms which may be used to offer a product or service to a Web user.

Referring to FIG. 2, several items 200 that can be provided to user 102 by any vendor Web site 215 in order to offer products and/or services are shown. Each of the items 200 (i.e., e-mail 202, Web page 204 and computer program 206) includes a URL 210 which points to vendor Web site 215. In addition, each of the items 200 can include other media which may be used to offer products and/or services. This includes text, photos, audio, or video which can describe the product or service. In addition, all items 200 can be sent to user 102 via the Web.

E-mail 202 is generally sent to a user via the Web by way of an e-mail application. E-mail 202 can be sent by any vendor Web site 215, a friend or acquaintance of user 102, or any third party that can communicate with user 102 via e-mail. The use of an e-mail to offer a product is advantageous because of the low cost of sending e-mail and the large amounts of possible customers that may be reached via e-mail. In addition, advertisement e-mails are inexpensive and easy to produce and modify.

A link to Web page 204 can be sent to a user 102 via e-mail, or may be found directly by user 102 through Web browsing. Like advertisement e-mails, the use of Web pages to advertise a product is advantageous because Web pages are inexpensive and easy to produce and modify. In addition, Web pages can be extended to encompass a variety of functions such as hit counting, visitor tracking and user customization.

Computer program 206 can be any executable computer program that is capable of conveying information relating to the product or service. Computer program 206 can be sent via e-mail, distributed on disk or can be downloaded from a Web site. Computer program 206 can be an interactive game or a multimedia program and can include a video or audio file which describes the product or service. The use of computer programs to offer a product is advantageous because of their flexibility. As described above, a computer program can include various types of media and can be customized to appeal to certain target market groups.

Cookies

Figure 3:
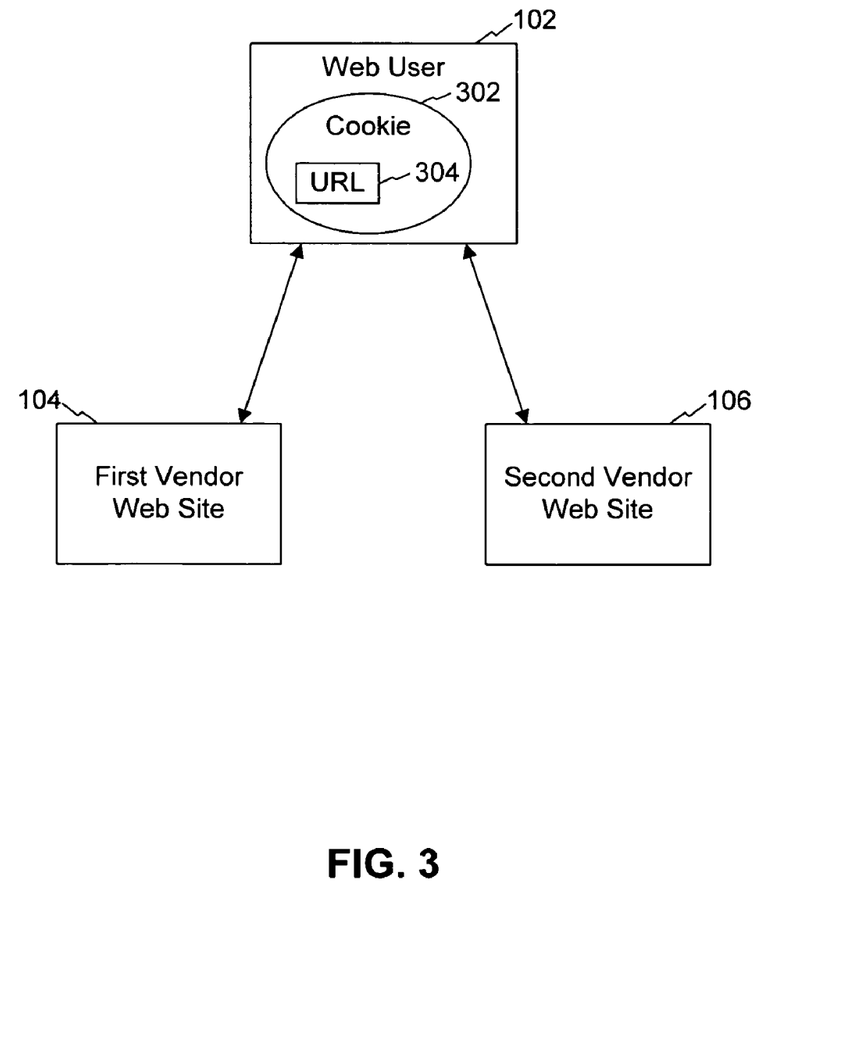
FIG. 3 illustrates the use of a cookie in the present invention.

Referring to FIG. 3, the use of a cookie 302 in the present invention is shown. As described above, Web site 104 places a cookie 302 on the computer of user 102 upon registration by user 102 for the product or service being offered on Web site 104. Cookie 302 can be placed on the computer of user 102 by either a client side program or a server side program. The use of client side or server side programs is described in greater detail below. In addition, cookie 302 can be associated with the Internet domain of Web site 104.

Cookie 302 can include several items, including a URL 304 which points to Web site 104. URL 304 identifies Web site 104 as the Web site responsible for supplying user 102 with the product or service. In addition, cookie 302 can include other items related to the product or service that was acquired by user 102. Such items may include, for example, a description of the product or service, the date and time the product or service was acquired, the version of the product or service, a brief description of all components of the product or service that were supplied, and an identifier of a customer representative who assisted user 102. Any information within cookie 302 can later be used by a Web site reading cookie 302 to determine the profile and needs of user 102.

Subsequently, Web site 106 offers user 102 the same product or service. Upon accessing of Web site 106 by user 102, Web site 106 attempts to search for a relevant cookie on the computer of user 102. Web site 106 seeks a cookie relating to the possession of the particular product or service by user 102. Specifically, Web site 106 can seek a cookie associated with the Internet domain of a Web site (possibly Web site 104 or Web site 106 itself) that offers the product or service. If Web site 106 does not find a relevant cookie on the computer of user 102, it may assume that user 102 does not already possess the product or service. Thus, Web site 106 can offer to supply the product or service to user 102. Otherwise, if Web site 106 finds a relevant cookie on the computer of user 102, it proceeds to read the cookie 302.

Upon reading cookie 302, Web site 106 determines whether user 102 possesses the product or service. Web site 106 can accomplish this determination in several ways. One way includes searching the cookie for the name of the product or service. Another way includes searching the cookie for a URL where the product or service can be acquired. Consequently, if Web site 106 determines from cookie 302 that user 102 does not possess the product or service, Web site 106 can then proceed to offer to supply the product or service to user 102. Otherwise, if Web site 106 determines from cookie 302 that user 102 already possesses the product or service, Web site 106 then redirects user 102 to the Web site (i.e., Web site 104) which is identified by the URL 304 within cookie 302.

In addition to reading URL 304 within cookie 302, Web site 106 or Web site 104 can read any additional information that is located in cookie 302. Each Web site may then decide subsequent actions based on data present in cookie 302. For example, if it is determined from cookie 302 that user 102 has not downloaded specific components of the product or service supplied by Web site 104, Web site 104 may then offer to supply such components to user 102. In another example, Web site 104 may determine from the information in cookie 302 that the version of the product or service in possession of user 102 is an outdated version or a version needing a patch or a fix. Subsequently, Web site 104 may offer to supply user 102 with an update, a patch or a fix to the product or service in possession of user 102. Upon reading the information in cookie 302, Web site 106 may either decide to redirect user 102 to Web site 104 or to offer to supply user 102 with any components, patches, or fixes that user 102 does not possess.

The use of a cookie 302 is advantageous because it allows information about a Web user 102 to be transmitted quickly and efficiently. As a result, a Web user 102 need not waste time logging into a Web site or indicating that they already possess a product or service. Cookies 102 allow a Web user 102 to navigate the Web more efficiently by not having to stop to enter information that he has already entered. In addition, cookies 302 can be transmitted securely using standard secure technologies such as Secure Socket Layer (SSL) or Secure HTTP.

Redirecting

The redirection described herein can be accomplished via standard HTTP redirect protocol. The following is a simple example of this process. User 102 follows a URL to Web site 106 and, therefore, sends an HTTP request for a Web page to Web site 106. Web site 106 receives the request and a server side program determines, as described above, that user 102 already possesses the product or service. In response to the HTTP request, Web site 106 replies with a URL to Web site 104. User 102 is then presented with Web site 104.

The use of redirection is advantageous because it allows a Web user 102 to be instantly redirected to a location that is more relevant. Redirection is often used to send a Web user 102 to the new location of a Web site that has moved or to send a Web user to a Web site with which it has previously registered. This allows the Web user to navigate the Web more efficiently without having to find a new location or the location of a previously visited Web site. Moreover, the use of redirection is convenient because it requires no user interaction.

Client Side and Server Side Programs

As described above, the program that reads cookie 302 and determines whether user 102 possesses the product or service may reside on the client side (i.e., on the computer of user 102) or the server side (i.e., on Web site 106).

Server side programs are advantageous because they allow the control to reside with the Web server hosting the Web site. The server is typically a faster, more powerful computer than that of the typical Web user and, therefore, would allow for quicker execution of a transaction. Examples of widely used server side programs are Common Gateway Interface (CGI) scripts, Java servlets, Hypertext Preprocessor (PHP) scripts, Perl scripts and the like.

Client side programs are advantageous because they allow the computing power to be distributed among multiple machines. This lightens the computing load of the Web server hosting the Web site and allows the server to use its resources for more important tasks. In the present invention, if the program is a client side program, user 102 must acquire the program beforehand. This can be accomplished by downloading the program via the Web from the Web site that requires it. Alternatively, the program can be acquired through other means such as obtaining it on a floppy disk. Examples of widely used client side programs are Java applets, Java scripts, Active X controls and the like.

Operation of the Present Invention

Figure 4:
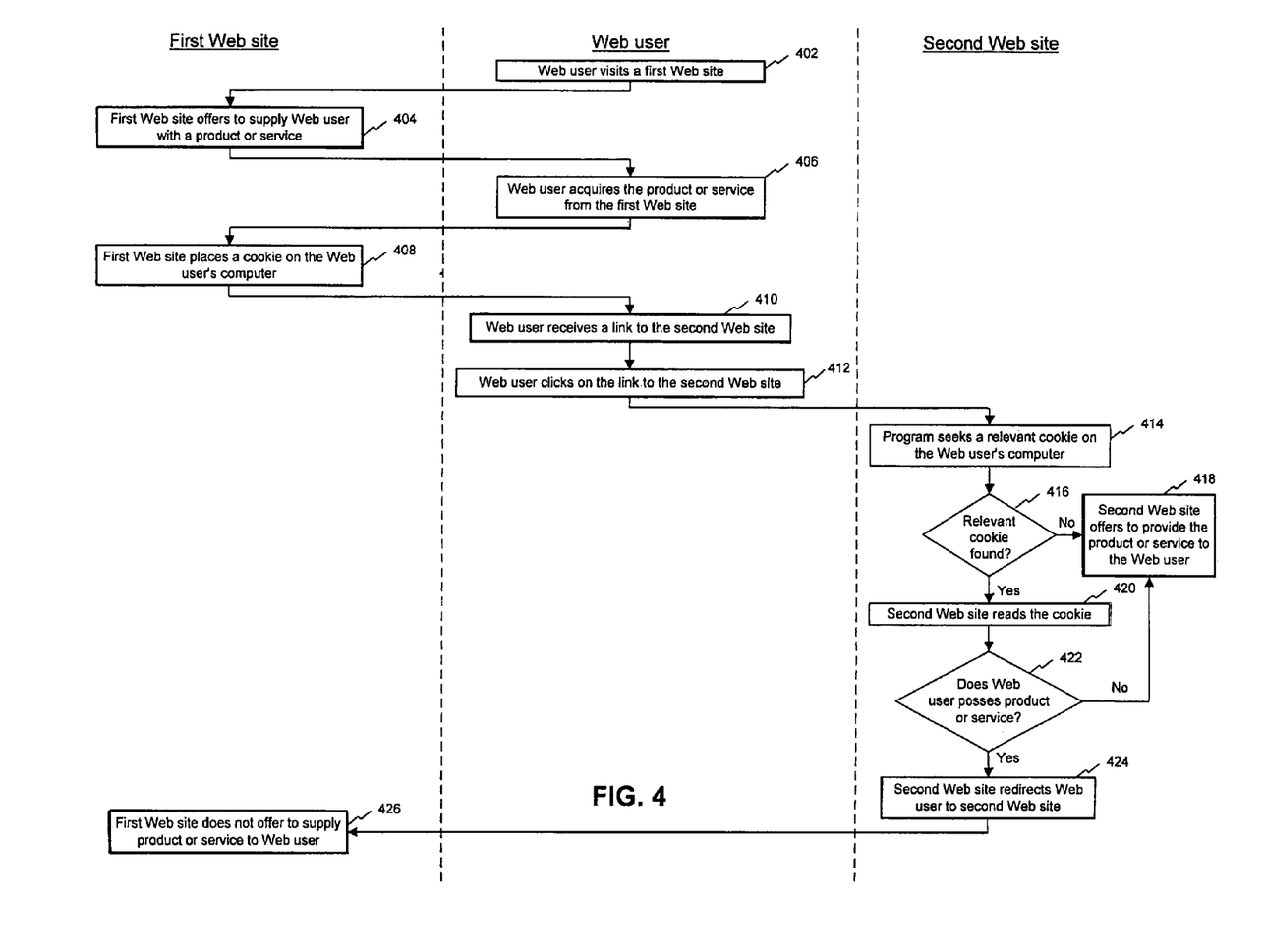
FIG. 4 is a flowchart of a scheme for redirecting a Web user to a previously selected Web site.

FIG. 4 is a high level flow diagram illustrating operation of an embodiment of the present invention for redirecting a Web user to a previously selected Web site. Note that FIG. 4 is separated into three columns. The left column represents the actions of Web site 104 (see FIG. 1), the middle column represents the actions of user 102, and the right column represents the actions of Web site 106.

In a step 402, user 102 visits Web site 104. See FIG. 1. This can be accomplished using a standard Web browser to browse the Web pages on Web site 104. User 102 may be responding to an offer, as described in detail above with reference to FIG. 2, for the product or service that is offered by Web site 104.

Subsequently, in a step 404, Web site 104 offers to supply user 102 with the product or service. This can be accomplished by providing a Web page or other type of media via Web site 104 that offers the product or service to user 102. In a step 406, user 102 decides to acquire the product or service from Web site 104. This can be accomplished by clicking on a particular link or somehow indicating, via the Web page, the desire to acquire the product or service. The product or service may then be downloaded via Web site 104 or acquired via some other manner such as receiving it via e-mail or by postal mail. Alternatively, step 406 can be accomplished during a phone call or other type of communication with Web site 104. In a step 408, in response to the acquiring of the product or service by user 102, Web site 104 places a cookie 302 (see FIG. 3) on the computer of user 102. Web site 104 can optionally associate cookie 302 with the Internet domain of Web site 104. At this point, user 102 is in possession of the product or service.

In a step 410, user 102 receives an offer for the product or service from another Web site. Specifically user 102 receives an offer containing a URL to Web site 106, which is attempting to supply the product or service to user 102. User 102, in a step 412, follows the URL to Web site 106. This step spawns the transmission of an HTTP request or other type of request for a Web page on Web site 106. As a result, a client side or server side program is executed that attempts to determine whether user 102 possesses the product or service.

Subsequently, in a step 414, the program seeks to determine the existence of a relevant cookie on the computer of user 102. The cookie sought by the program, is a cookie relating to the product or service being offered by Web site 106 (i.e., cookie 302). Specifically, Web site 106 can seek a cookie associated with the Internet domain of a Web site (possibly Web site 104 or Web site 106 itself) that offers the product or service. In a step 416, the program determines whether a relevant cookie is found. If a relevant cookie is not found, Web site 106 determines that user 102 does not possess the product or service and Web site 106 then proceeds to offer the product or service to user 102, in a step 418. If a relevant cookie is found, in a step 420, Web site 106 then proceeds to read cookie 302.

Upon reading the information in cookie 302, Web site 106 determines, in a step 422, whether user 102 possesses the product or service as described in detail above. If Web site 106 determines that user 102 does not possess the product or service, Web site 106 then offers to provide the product or service to user 102, in a step 418. Otherwise, if Web site 106 determines that user 102 possesses the product or service, Web site 106 redirects, in a step 424, user 102 to Web site 104, which is specified in cookie 302. Then, in a step 426, user 102 is presented with Web site 104 and does not receive a duplicate offer for the same product or service from Web site 106.

Alternatively, steps 414-422 can be executed by Web site 104. In this alternative, Web site 104 offers the product or service to user 102 in step 410. Then, user 102 visits Web site 104 in step 412. Subsequently, Web site 104 performs steps 414-422 in the same manner that Web site 106 would perform these steps as described above. Step 424 would not be executed by Web site 104 as no redirection would be necessary. As such, step 426 would be executed immediately after step 422. In addition, after step 426, Web site 104 may offer other products or services to user 102 based on the information specified in cookie 302 (as described above).

Environment

Figure 5:
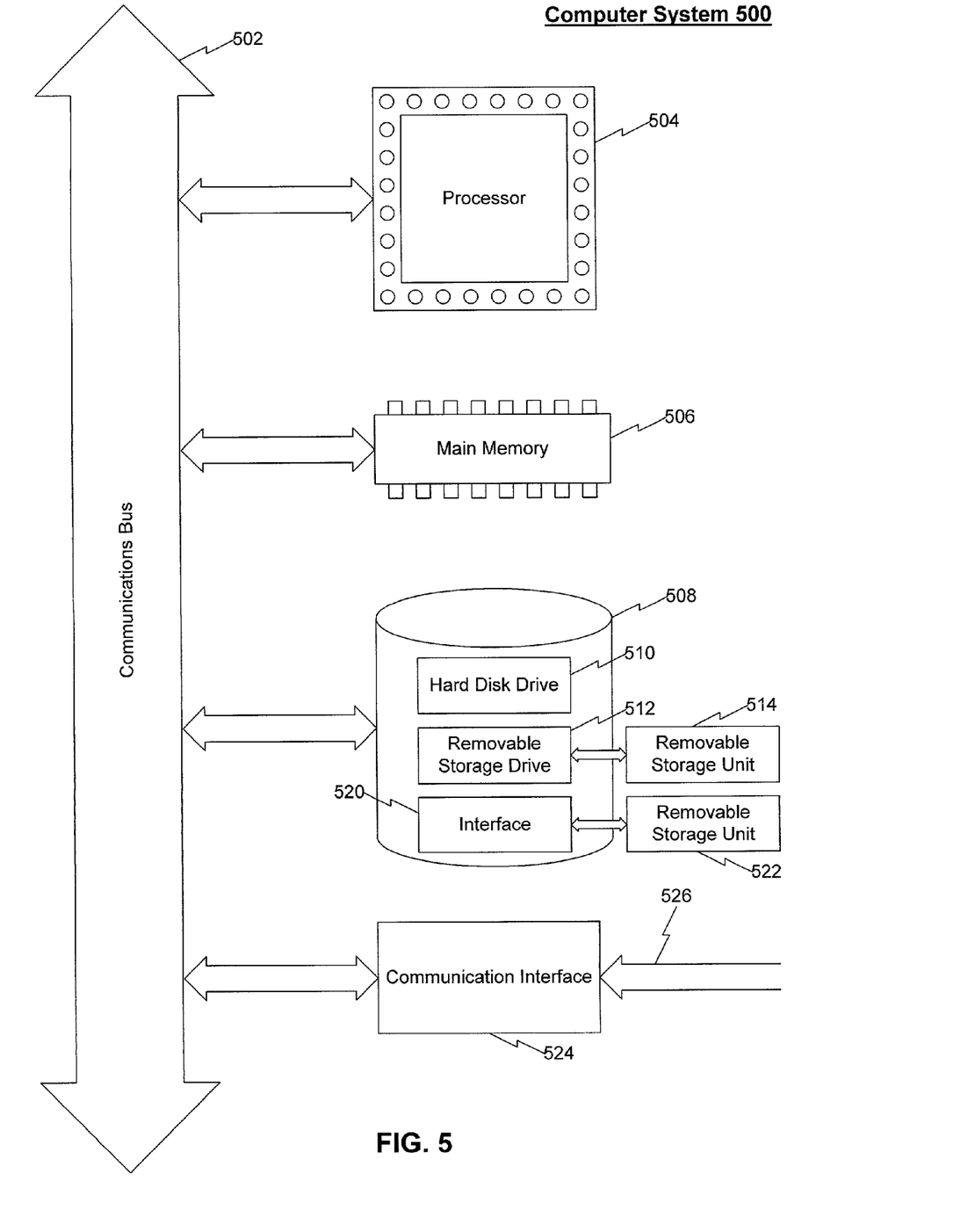
FIG. 5 is an example computer system and computer program product that can be used to implement the present invention.

The functions performed by the computers of user 102, Web site 104 and Web site 106 are preferably implemented in software. Alternatively, the same may be implemented using hardware or a combination of hardware and software. Furthermore, user 102 comprises a person and a computer system connected to a network. Likewise, Web sites 104 and 106 comprises a computer system connected to a network. Consequently, the invention can be implemented on a computer system or other processing system. An example of such a computer system 500 is shown in FIG. 5. In the present invention, for example, computers of user 102, Web site 104 and Web site 106 each execute on distinct computer systems 500.

The computer system 500 represents any single or multi-processor computer. Single-threaded and multi-threaded computers can be used. Unified or distributed memory systems can be used.

The computer system 500 includes one or more processors, such as processor 504. One or more processors 504 can execute software implementing the operations described in the flowchart of FIG. 4. Each processor 504 is connected to a communication bus 502 (e.g., cross-bar or network). Various software embodiments are described in terms of this exemplary computer system. After reading this description, it will become apparent to a person skilled in the relevant art how to implement the invention using other computer systems and/or computer architectures.

Computer system 500 also includes a main memory 506, preferably random access memory (RAM), and can also include a secondary memory 508. The secondary memory 508 can include, for example, a hard disk drive 510 and/or a removable storage drive 512, representing a floppy disk drive, a magnetic tape drive, an optical disk drive, etc. The removable storage drive 512 reads from and/or writes to a removable storage unit 514 in a well known manner. Removable storage unit 514 represents a floppy disk, magnetic tape, optical disk, etc., which is read by and written to by removable storage drive 512. As will be appreciated, the removable storage unit 514 includes a computer usable storage medium having stored therein computer software and/or data.

In alternative embodiments, secondary memory 508 can include other means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 520 can include a modem, a network interface (such as Ethernet card), a communications port, etc. Software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

The present invention can be implemented using software running (that is, executing) in an environment similar to that described above with respect to FIG. 5. In this document, the term "computer program product" is used to generally refer to removable storage unit 514, a hard disk installed in hard disk drive 510, or a carrier wave carrying software over a communication path 526 (wireless link or cable) to communication interface 524. A computer useable medium can include magnetic media, optical media, or other recordable media, or media that transmits a carrier wave. These computer program products are means for providing software to computer system 500.

Computer programs (also called computer control logic) are stored in main memory 506 and/or secondary memory 508. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software can be stored in a computer program product and loaded into computer system 500 using removable storage drive 512, hard drive 510, or communications interface 524. Alternatively, the computer program product can be downloaded to computer system 500 over communications path 524. The control logic (software), when executed by the one or more processors 504, causes the processor(s) 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

CONCLUSION

The previous description of the preferred embodiments is provided to enable any person skilled in the art to make or use the present invention. The various modifications to these embodiments will be readily apparent to those skilled in the art, and the generic principles defined herein can be applied to other embodiments without the use of inventive faculty. Thus, the present invention is not intended to be limited to the embodiments shown herein but is to be accorded the widest scope consistent with the principles and novel features disclosed herein.

What is claimed is:

1. A computer-method, comprising:

processing or storing information regarding a purchase or an acquisition of a first product or a first service by a user, wherein the information regarding the purchase or the acquisition is processed by or stored by a first processor associated with a first web site, and wherein the purchase or the acquisition of the first product or the first service is made in response to an offer associated with the first web site, and further wherein the purchase or the acquisition of the first product or the first service is performed by the user via a computer associated with or used by the user;

placing a cookie on the computer, wherein the cookie is placed on the computer by the first web site or by the first processor, and further wherein the cookie contains information regarding the first web site and information indicating that the user has purchased or acquired the first product or the first service from or via the first web site;

providing a uniform resource locator (URL) offering a second product or a second service, wherein the URL is provided by a second web site or by a second processor associated with the second web site, and further wherein the URL specifies a program on or associated with the second web site;

receiving a signal indicative of an activation of the URL;

reading or processing information contained in the cookie in response to the activation of the URL, wherein the information contained in the cookie is read or processed using the program;

determining whether or not the user has previously purchased or acquired the first product or the first service and determining whether or not the user has previously purchased or acquired the second product or the second service; and redirecting the user from the second web site to the first web site if it is determined that the user has previously purchased or acquired the first product or the first service and providing an offer from the second web site to sell the second product or the second service to the user if it is determined that the user has not previously purchased or acquired the first product or the first service and that the user has not previously purchased or acquired the second product or the second service, wherein the first product is a same product as the second product or the first service is a same service as the second service.

2. The computer-method of claim 1, further comprising:

sending an e-mail to the computer which includes a link to the URL, providing a web page to the computer which includes a link to the URL, or providing a computer program to the computer which includes a link to the URL.

3. The computer-implemented method of claim 1, wherein the activation of the URL comprises a clicking of a link to the URL on a web page, a clicking of a link to the URL in an e-mail, or an executing of a computer program that activates a link to the URL.

4. The computer-implemented method of claim 1, further comprising:
placing a sharable file on the computer in response to the user registering with the first web site for or regarding the first product or the first service, wherein the sharable file is placed on the computer by the first web site, wherein the shareable file includes a second URL, and further wherein the second URL corresponds to or is associated with the first web site.

5. The computer-implemented method of claim 1, wherein the program is a server side program.

6. The computer-implemented method of claim 1, wherein the program is a CGI script, a Java servlet, a PHP script, or a Perl script.

7. The computer-implemented method of claim 1, wherein the program is a client side program capable of being downloaded from the second web site.

8. The computer-implemented method of claim 7, wherein the program is a Java applet, a Java script, or an Active X control.

9. The computer-implemented method of claim 1, wherein the cookie is read via a wireless link.

10. A computer-method, comprising:
processing or storing information regarding a purchase or an acquisition of a first product or a first service by a user, wherein the information regarding the purchase or the acquisition is processed or stored by a first processor associated with a first web site, and wherein the purchase or the acquisition of the first product or the first service is made in response to an offer associated with the first web site, and further wherein the purchase or the acquisition of the first product or the first service is performed by the user via a computer associated with or used by the user;
placing a cookie on the computer, wherein the cookie is placed on the computer by the first web site or by the first processor, and further wherein the cookie contains information regarding the first web site and information indicating that the user has purchased or acquired the first product or the first service from or via the first web site;
means for causing the computer to send an e-mail including a link to said URL to the user;
providing a uniform resource locator (URL) offering a second product or a second service, wherein the URL is provided by a second web site or by a second processor associated with the second web site, wherein the a link to the URL is provided in an e-mail, in a web page, or in a first program, and further wherein the URL specifies a second program on or associated with the second web site;
receiving a signal indicative of an activation of the URL;
reading or processing information contained in the cookie in response to the activation of the URL, wherein the information contained in the cookie is read or processed using the second program;
determining whether or not the user has previously purchased or acquired the first product or the first service and determining whether or not the user has previously purchased or acquired the second product or the second service; and
redirecting the user from the second web site to the first web site if it is determined that the user has previously purchased or acquired the first product or the first service and providing an offer to sell the second product or the second service to the user if it is determined that the user has not previously purchased or acquired the first product or the first service and that the user has not previously purchased or acquired the second product or the second service,
wherein the first product is a same product as the second product or the first service is a same service as the second service.

11. The computer-implemented method of claim 10, further comprising:
placing a sharable file on the computer in response to the user registering with the first web site for or regarding the first product or the first service, wherein the sharable file is placed on the computer by the first web site, and further wherein the shareable file includes a second URL, and further wherein the second URL corresponds to or is associated with the first web site.

* * * * *